(12) United States Patent
Ikeda et al.

(10) Patent No.: US 7,952,636 B2
(45) Date of Patent: May 31, 2011

(54) METHOD FOR DRIVING SOLID-STATE IMAGING DEVICE AND IMAGING APPARATUS

(75) Inventors: Katsumi Ikeda, Miyagi (JP); Hirokazu Kobayashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 413 days.

(21) Appl. No.: 12/204,513

(22) Filed: Sep. 4, 2008

(65) Prior Publication Data

US 2009/0066827 A1    Mar. 12, 2009

(30) Foreign Application Priority Data

Sep. 6, 2007    (JP) .............................. P2007-231913

(51) Int. Cl.
*H04N 3/14* (2006.01)
*H04N 9/083* (2006.01)
(52) U.S. Cl. ......... 348/311; 348/315; 348/275; 348/277
(58) Field of Classification Search .................. 348/311, 348/315, 316–318, 273, 275, 280, 319, 321, 348/322; 250/208.1

See application file for complete search history.

(56) References Cited

U.S. PATENT DOCUMENTS

| | | | |
|---|---|---|---|
| 6,198,507 B1 * | 3/2001 | Ishigami | 348/273 |
| 6,661,451 B1 * | 12/2003 | Kijima et al. | 348/220.1 |
| 6,686,960 B2 * | 2/2004 | Iizuka | 348/273 |
| 6,744,466 B1 | 6/2004 | Furumiya et al. | |
| 7,002,630 B1 * | 2/2006 | Iizuka | 348/322 |
| 7,570,290 B2 * | 8/2009 | Yokota et al. | 348/275 |
| 7,636,119 B2 * | 12/2009 | Parks | 348/321 |
| 2003/0169355 A1 * | 9/2003 | Kubo | 348/272 |
| 2004/0017497 A1 | 1/2004 | Suzuki et al. | |
| 2005/0243195 A1 * | 11/2005 | Parks | 348/311 |

FOREIGN PATENT DOCUMENTS

| | | |
|---|---|---|
| JP | 11-261901 A | 9/1999 |
| JP | 2004-55786 A | 2/2004 |

* cited by examiner

*Primary Examiner* — Nhan T Tran
(74) *Attorney, Agent, or Firm* — Birch, Stewart, Kolasch & Birch, LLP (57) ABSTRACT

A plurality of charge accumulation packets each of which is configured to accumulate signal charges from photoelectric conversion elements corresponding to (2n−1) rows where n denotes an integer equal to or larger than 2 are formed in to vertical charge transfer sections. The signal charges of the same color component are read from the photoelectric conversion elements corresponding to plural rows into each charge accumulation packet and are added in each charge accumulation packet. Then, the signal charges in the vertical charge transfer sections are transferred by a distance corresponding to one charge accumulation packet. A signal charge, which remains in the photoelectric conversion element and has the same color component as the electric charges previously read into each charge accumulation packet, is read into each charge accumulation packet. The newly read signal charge and the previously read signal charges are added in each charge accumulation packet.

1 Claim, 11 Drawing Sheets

METHOD FOR DRIVING SOLID-STATE IMAGING DEVICE AND IMAGING APPARATUS

CROSS-REFERENCE TO RELATED APPLICATIONS

This application is based upon and claims the benefit of priority from the Japanese Patent Application No. 2007-231913 filed on Sep. 6, 2007, the entire contents of which are incorporated herein by reference.

BACKGROUND OF THE INVENTION

1. Technical Field

The invention relates to a method for driving a solid-state imaging device and an imaging apparatus, and more particularly, to the method for driving the solid-state imaging device in taking moving images or in controlling AE (automatic exposure)/AF (automatic focus), and the imaging apparatus.

2. Description of the Related Art

A solid-state imaging device has been frequently used in an electronic still camera, a digital imaging apparatus for moving images. Generally, in the electronic still cameras, AE (automatic exposure)/AF (automatic focus) control is performed prior to taking an image. If this control is performed using signal charges which have been accumulated in all pixels of the solid-state imaging device, it takes a long time to finish this control, and it is concerned that a good photographing opportunity may be missed. For this reason, it is required to increase a frame rate during the AE (automatic exposure)/AF (automatic focus) control to be almost several times as high as the frame rate for ordinary imaging.

Moreover, since even decrease in resolution during the AE (automatic exposure)/AF (automatic focus) control does not pose a problem, the frame rate has been increased by skipping image signals which are obtained by the solid-state imaging device. For moving images, demand for a resolution is not as strong as in the electronic still camera because images are moving. Also, a high frame rate is required in order to take moving images. Therefore, the control of skipping image signals has been performed for moving images. However, the skipping control causes such a problem that an amount of signal charges decreases and that sensitivity is lowered.

In order to deal with such a problem, for example, JP Hei. 11-261901 A (corresponding to U.S. Pat. No. 6,744,466) has proposed a method for driving a solid-state imaging device, the method including selectively reading signal charges from two pixel lines in a cycle of three vertical pixels lines, and adding the signal charges of the two pixel lines in a horizontal transfer section for output.

Also, several methods have been proposed for arranging photoelectric conversion elements of a solid-state imaging element. For example, JP 2004-55786 A (corresponding to US 2004/0017497 A) has proposed, as a arrangement other than a square lattice arrangement, a honeycomb arrangement in which odd-numbered rows and even-numbered rows of photoelectric conversion element rows are shifted by ½ pitch in a row direction and in a column direction.

However, according to the method for driving the solid-state imaging device described in JP Hei. 11-261901 A, the signal charges of the two pixel lines are selectively read in the cycle of three vertical pixels lines, the signal charges of the two pixel lines are added in the horizontal transfer section, and remaining pixel data which are not read are discarded. As a result, sensitivity is sacrificed, and moving images may become short of brightness in a dark environment, or accuracy of the AE/AF control may be deteriorated.

SUMMARY OF THE INVENTION

The invention has been made in view of the above circumstances and provides a method for driving a solid-state imaging device and an imaging apparatus, in which signal charges of all pixels are used in signal processing for taking moving images and performing AE/AF control to thereby obtain moving images having high sensitivity and an AE/AF image having high sensitivity.

The object of the invention can be achieved by any of the following methods and configuration.

[1] A solid-state imaging device includes a light receiving section, a plurality of vertical charge transfer sections and a horizontal charge transfer section. In the light receiving section, a plurality of photoelectric conversion elements are arranged in row and column directions on a semiconductor substrate. The plurality of vertical charge transfer sections extend along the column direction of the photoelectric conversion elements, are arranged adjacent to the photoelectric conversion elements, read signal charges which are generated in the photoelectric conversion elements, and transfer the signal charges in a vertical direction. The horizontal charge transfer section transfers in a horizontal direction the signal charges, which are transferred from the vertical charge transfer sections. The photoelectric conversion elements, which detect at least three different color components, are arranged in the light receiving section. A method for driving the solid-state imaging device includes: forming a plurality of charge accumulation packets in the vertical charge transfer sections, each charge accumulation packet being configured to accumulate signal charges from the photoelectric conversion elements corresponding to $(2n-1)$ rows where n denotes an integer equal to or larger than 2; reading signal charges of the same color component from the photoelectric conversion elements corresponding to plural rows into each charge accumulation packet; adding, in each charge accumulation packet, the signal charges read into each charge accumulation packet to each other; transferring the signal charges in the vertical charge transfer sections by a distance corresponding to one charge accumulation packet; newly reading, into each charge accumulation packet, a signal charge that remains in the photoelectric conversion element and has the same color component as the electric charges previously read into each charge accumulation packet; and adding the newly read signal charge and the previously read signal charges to each other in each charge accumulation packet.

This method drives the solid-state imaging device including the light receiving section in which the photoelectric conversion elements which detect the at least three different color components are arranged in the row and column directions, the vertical charge transfer sections which read the signal charges from the photoelectric conversion elements and transfer the signal charges in the vertical direction, and the horizontal charge transfer section which transfers in the horizontal direction the signal charges being transferred from the vertical charge transfer sections. The method includes forming, in each vertical charge transfer section, charge accumulation packets each of which is configured to accumulate the signal charges from the photoelectric conversion elements corresponding to $(2n-1)$ rows where n denotes an integer equal to or larger than 2, reading signal charges of the same color component from the photoelectric conversion elements corresponding to plural rows into each charge accumulation packet, adding in each charge accumulation packet the signal charges read into each charge accumulation packet, then vertically transferring the signal charges by a distance corresponding to one charge accumulation packet, newly reading into each charge accumulation packet a signal charge that remains in the photoelectric conversion element and has the same color component as the photoelectric charges previously read into each charge accumulation packet, and adding the newly read signal charge and the previously read signal charges. As a result, for the signal charges accumulated in all the photoelectric conversion elements, signal charges having the same color component can be added to each other in each charge accumulation packet. Thereby, it is possible to enhance the sensitivity of the solid-state imaging device by using the signal charges of all the pixels without discarding the signal charges.

[2] In the method for driving the solid-state imaging device of [1], in each column of the photoelectric conversion elements, the photoelectric conversion element, which detects one color component corresponding to each column, and the photoelectric conversion element, which detects another color element corresponding to each column, may be alternately arranged along the column direction.

In this driving method, in each column of the photoelectric conversion elements, the photoelectric conversion element, which detects one color component corresponding to each column, and the photoelectric conversion element, which detects another color element corresponding to each column, are alternately arranged along the column direction. Therefore, even in the solid-state imaging device in which the photoelectric conversion elements are arranged in a square lattice pattern based on the Bayer arrangement, substantially the same advantage as that described above can be obtained.

[3] In the method for driving the solid-state imaging device of [1], in the light receiving section, a first photoelectric conversion element column and a second photoelectric conversion element column, which is shifted by ½ of an array pitch with respect to the first photoelectric conversion column in the vertical and horizontal directions, may be arranged alternately in the row direction. In each of the first photoelectric conversion element columns, the photoelectric conversion element, which detects one color component corresponding to each first photoelectric conversion element column, and the photoelectric conversion element, which detects another color element corresponding to each first photoelectric conversion element column, may be alternately arranged along the column direction.

In this driving method, in the light receiving section, a first photoelectric conversion element column and a second photoelectric conversion element column, which is shifted by ½ of an array pitch with respect to the first photoelectric conversion column in the vertical and horizontal directions, are arranged alternately in the row direction. Also, in each of the first photoelectric conversion element columns, the photoelectric conversion element, which detects one color component corresponding to each first photoelectric conversion element column, and the photoelectric conversion element, which detects another color element corresponding to each first photoelectric conversion element column, are alternately arranged along the column direction. Therefore, even in the solid-state imaging device having the so-called double Bayer arrangement in which the photoelectric conversion elements are arranged in a staggered manner, substantially the same advantage as that described above can be obtained.

[4] A solid-state imaging device includes a light receiving section, a plurality of vertical charge transfer sections, a horizontal charge transfer section and a line memory. In the light receiving section, a plurality of photoelectric conversion elements are arranged in row and column directions on a semiconductor substrate. The plurality of vertical charge transfer sections extend along the column direction of the photoelectric conversion elements, are arranged adjacent to the photoelectric conversion elements, read signal charges which are generated in the photoelectric conversion elements, and transfer the signal charges in a vertical direction. The horizontal charge transfer section transfers in a horizontal direction the signal charges, which are transferred from the vertical charge transfer sections. The line memory is disposed between the vertical charge transfer sections and the horizontal charge transfer section. In each column of the photoelectric conversion elements, the photoelectric conversion element, which detects one color component corresponding to each column, and the photoelectric conversion element corresponding to each column, which detects another color element, are alternately arranged along the column direction. A method for driving the solid-state imaging device includes: sequentially repeating, along the column direction, (i) reading, into the vertical charge transfer sections, the signal charges of the photoelectric conversion elements corresponding to two rows and (ii) not reading, into the vertical charge transfer sections, the signal charges of the photoelectric conversion elements corresponding to one row, to separately arrange blank charge packets in the vertical charge transfer sections, each of the blank charge packets corresponding to one row; transferring the signal charges in the vertical charge transfer sections by a distance corresponding to three rows; reading, into each blank charge packet, the signal charge, which remains in the photoelectric conversion element and has the same color component as the signal charges accumulated in charge packets in front and rear of each blank charge packet, to obtain a set of three consecutive signal charges having the same color component; adding the obtained three consecutive signal charges of each set to each other in the line memory or in the horizontal charge transfer section; and transferring the added signal charges.

This driving method drives the solid-state imaging device in which in each column of the photoelectric conversion elements, the photoelectric conversion element, which detects one color component corresponding to each column, and the photoelectric conversion element, which detects another color element corresponding to each column, are alternately arranged along the column direction. This method sequentially repeats, along the column direction, (i) reading the signal charges of the photoelectric conversion elements corresponding to two rows and (ii) not reading the signal charges of the photoelectric conversion elements corresponding to one row, to separately arrange blank charge packets each corresponding to one row in the vertical charge transfer sections; then transfers the signal charges by a distance corresponding to three rows; reads, into each blank charge packet, the signal charge, which remains in the photoelectric conversion element and has the same color component as the signal charges accumulated in charge packets in front and rear of each blank charge packet, to obtain a set of three consecutive signal charges having the same color component around; and adds the obtained three consecutive signal charges of each set to each other in the line memory or in the horizontal charge transfer section. Therefore, it is possible to utilize the signal charges of all the pixels without discarding the signal charges. Thereby, high sensitivity of the solid-state imaging device can be achieved.

[5] An imaging apparatus includes a solid-state imaging device, a signal processing unit and an optical system. The solid-state imaging device includes a light receiving section, a plurality of vertical charge transfer sections and a horizontal charge transfer section. In the light receiving section, a plurality of photoelectric conversion elements are arranged in row and column directions on a semiconductor substrate. The photoelectric conversion elements, which detect at least three different color components, are arranged in the light receiving section. The plurality of vertical charge transfer sections extend along the column direction of the photoelectric conversion elements, are arranged adjacent to the photoelectric conversion elements, read signal charges which are generated in the photoelectric conversion elements, and transfer the signal charges in a vertical direction. The horizontal charge transfer section transfers in a horizontal direction the signal charges, which are transferred from the vertical charge transfer sections. The signal processing unit performs signal processing based on the method for driving the solid-state imaging device according to any one of [1] to [4]. The optical system forms an optical image on the solid-state imaging device.

The imaging apparatus having the above configuration includes the signal processing unit, which performs the signal processing for the solid-state imaging device having the light receiving section, the vertical charge transfer sections and the horizontal charge transfer section, based on the method for driving the solid-state imaging device according to any one of [1] to [4]; and the optical system, which forms an optical image on the solid-state imaging device. Therefore, the imaging apparatus having enhanced sensitivity can be obtained by using all the signal charges which are accumulated in the photoelectric conversion elements, and it is possible to obtain a clear image even if a dark scene is photographed.

[6] In the imaging apparatus of [5], when moving images are taken or when automatic exposure and automatic focus control is performed, the signal processing unit switches to the signal processing based on the method for driving the solid-state imaging device.

In the imaging apparatus having the above configuration, when moving images are taken or when the AE/AF control is performed, the signal processing is switched to the driving method according to any one of [1] to [4]. As a result, the signal charges which are accumulated in the photoelectric conversion elements will not be discarded uselessly, and even in a photographic scene where light is not sufficient, the moving images of high sensitivity can be obtained. Moreover, it is possible to take an image with the accurately controlled AE/AF.

According to the method for driving the solid-state imaging device and the imaging apparatus set forth above, of the signal charges accumulated in all the photoelectric conversion elements, signal charges having the same color component are added to each other and processed. Thereby, it is possible to enhance the sensitivity of the solid-state imaging device with the signal charges of all the pixels being used and without the signal charges being discarded. Moreover, even in a photographic scene where light is not sufficient, the moving images of high sensitivity can be obtained, by taking the images at the enhanced sensitivity. Furthermore, it is possible to take an image with the accurately controlled AE/AF.

DETAILED DESCRIPTION OF EMBODIMENTS OF THE INVENTION

Now, an imaging apparatus according to exemplary embodiments of the invention and a method for driving a solid-state imaging device for use in the imaging apparatus will be described in detail, with reference to the accompanying drawings. In these exemplary embodiments, a digital camera provided with a CCD solid-state imaging device will be described as an example of the imaging apparatus.

First Embodiment

Figure 1:
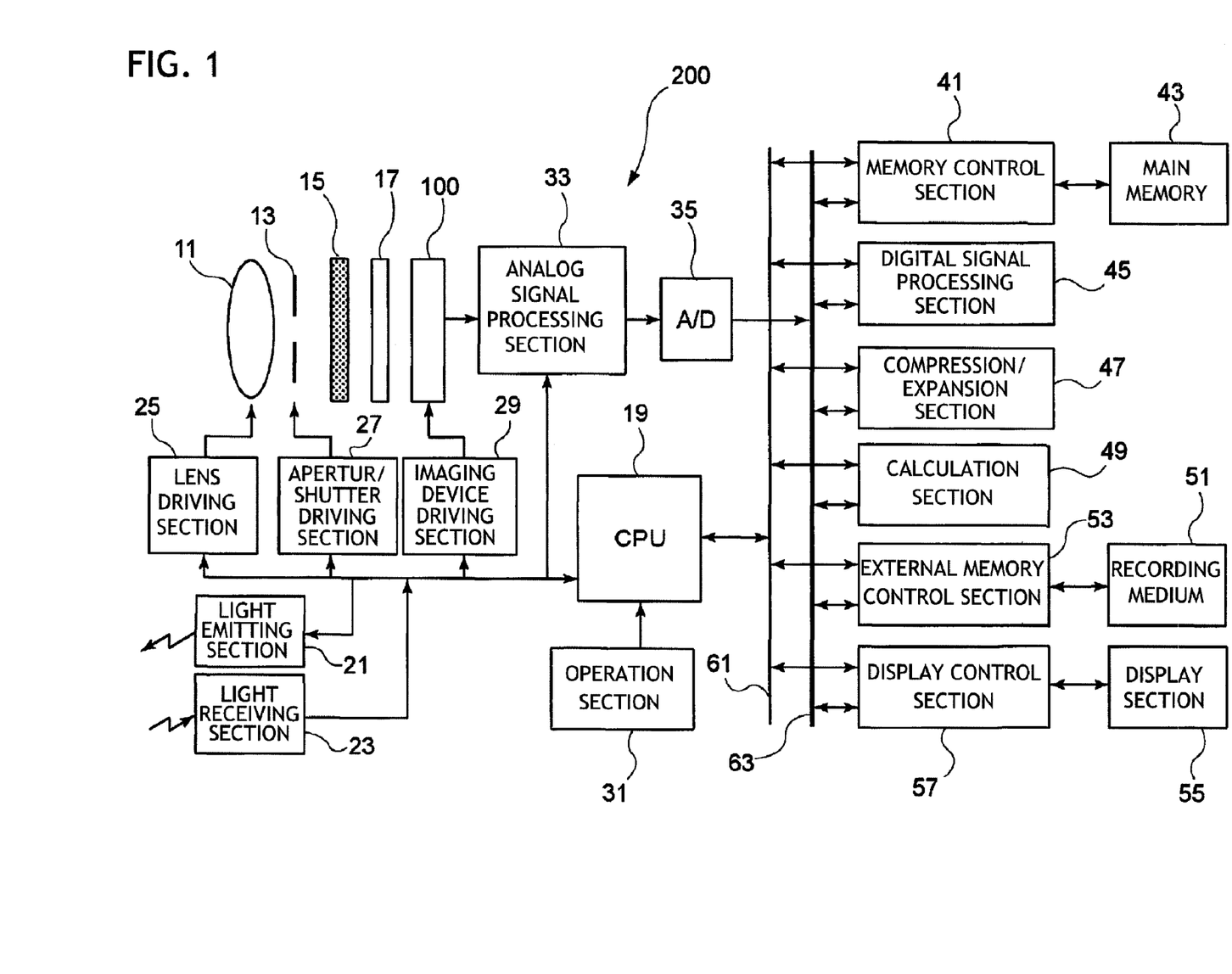
FIG. 1 is a block diagram of a digital camera which is provided with a CCD solid-state imaging device according to an embodiment of the invention.

FIG. 1 is a block diagram of the digital camera provided with the CCD solid-state imaging device according to the embodiments of the invention.

As shown in FIG. 1, a digital camera 200 (an example of the imaging apparatus) according to this embodiment includes an imaging lens 11 and a solid-state imaging device 100 (for example, the CCD solid-state imaging device). The digital camera 200 also includes an aperture 13, a ultra-red ray cutting filter 15 and an optical low pass filter 17 which are provided between the lens 11 and the imaging device 100. A CPU 19 for extensively controlling an entirety of the digital camera 200 controls a flash light emitting section 21 and a light receiving section 23. The CPU 19 also controls a lens driving section 25 to adjust a position of the imaging lens 11 to a focus position (AF control), and controls an opening amount of the aperture 13 (AE control) through an aperture/shutter driving section 27 to adjust an amount of light for exposure.

The CPU 19 drives the solid-state imaging device 100 via an imaging device driving section 29 to output an image of an object, which is taken through the imaging lens 11, as a color image. Command signals from a user are input into the CPU 19 through an operation section 31, and the CPU performs various controls according to these command signals.

An electric controlling system of the digital camera 200 includes an analog signal processing section 33 connected to an output of the solid-state imaging device 100, and an A/D converting circuit 35 for converting color signals of RGB, which are output from the analog signal processing section 33, into digital signals. All of them are controlled by the CPU 19.

The electric controlling system of the digital camera 200 also includes a memory control section 41 connected to a main memory (frame memory) 43, a digital signal processing section 45 for performing image processes, such as a gamma correction operation, a RGB/YC conversion process and an image synthesizing process, a compression/expansion processing section 47 for compressing a taken image into a JPEG image, and expanding the compressed image, a calculation section 49 for calculating measured light data to obtain a gain for white balance correction, which is conducted by the digital signal processing section 45, an external memory control section 53 connected to a detachable recording medium 51, a display control section 57 connected to a display section 55 which is mounted on a back face of the camera. All of these sections are interconnected by a control bus 61 and a data bus 63, and are controlled based on commands from the CPU 19.

Figure 2:
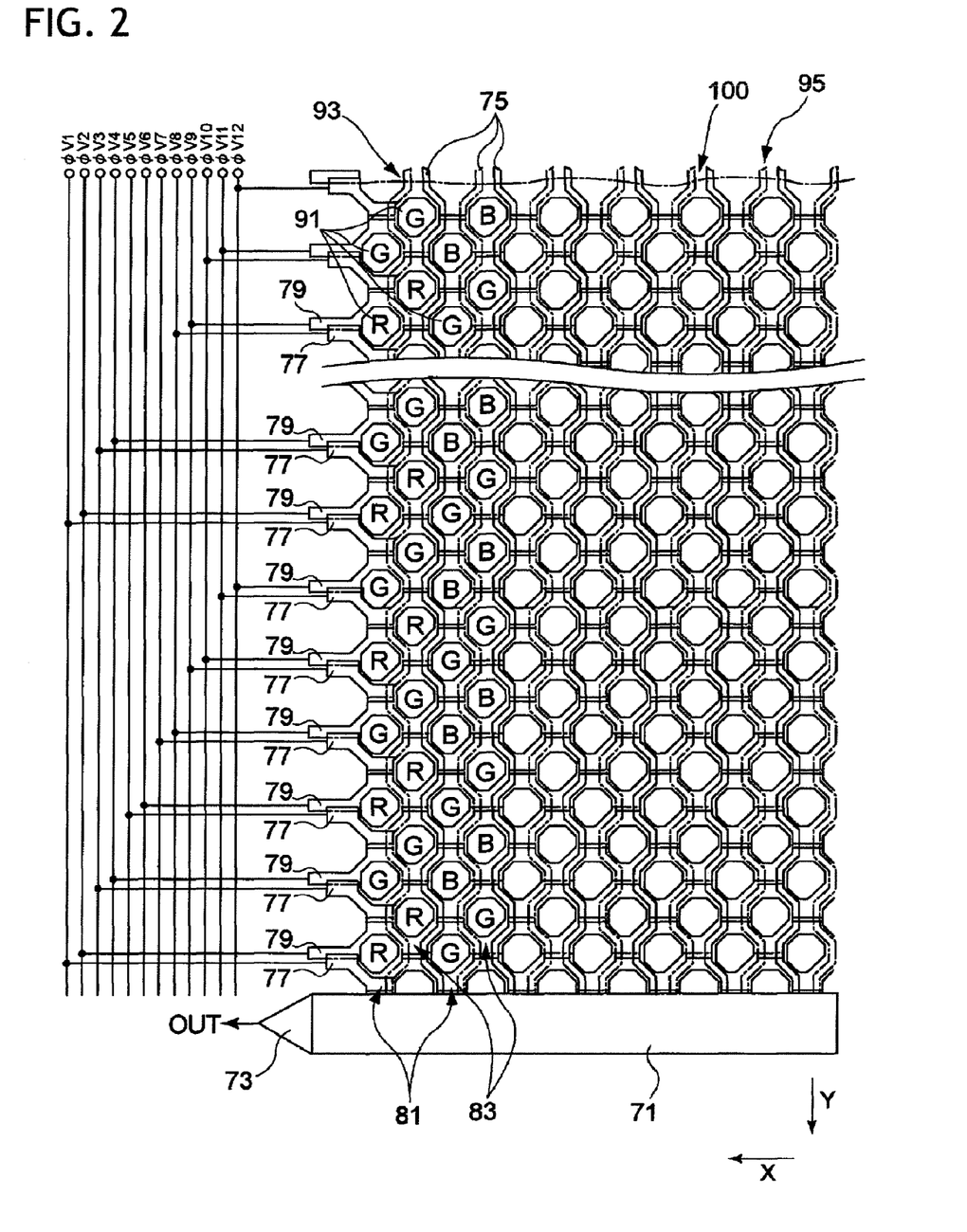
FIG. 2 is an enlarged plan view of a main part of the solid-state imaging device according to the embodiment of the invention.
Figure 3:
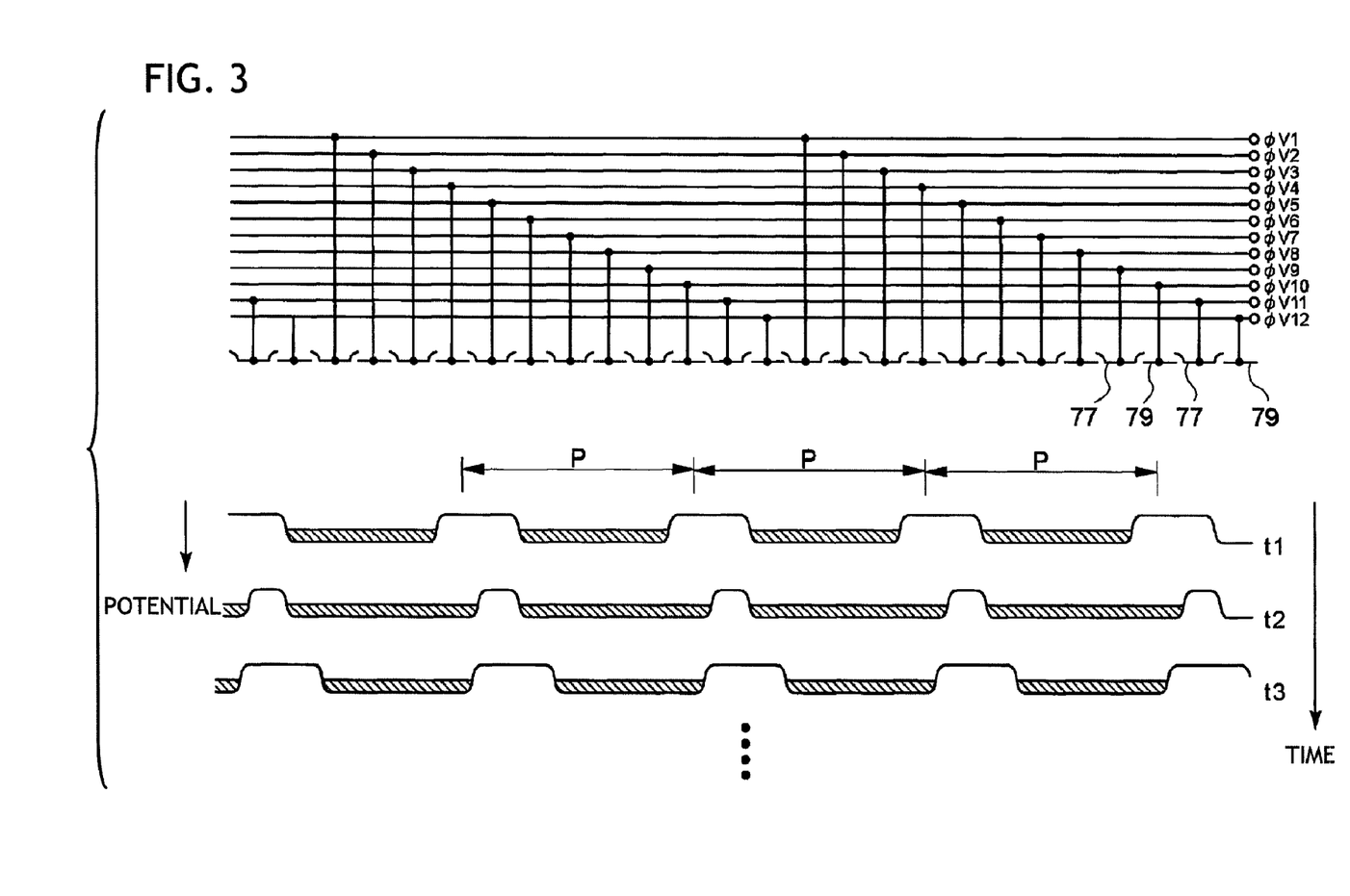
FIG. 3 is an explanatory view schematically showing vertical charge transfer electrodes and transferred signals, and showing distribution of electric potentials generate by the vertical charge transfer electrodes, according to a first embodiment.
Figure 4:
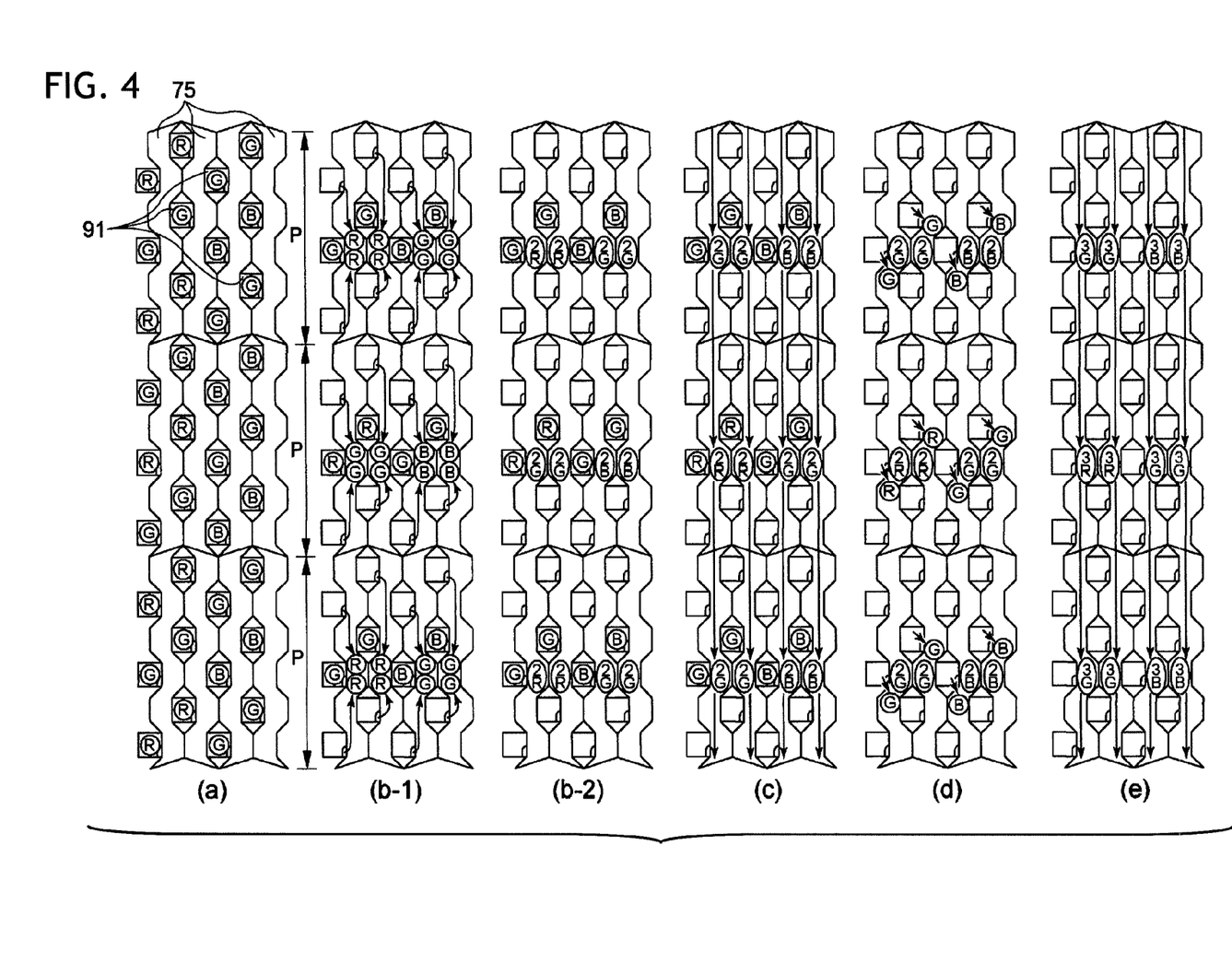
FIG. 4 is a schematic view showing a method for driving the solid-state imaging device, according to the first embodiment.

Then, the solid-state imaging device and the method for driving the imaging device will be described with reference to FIGS. 2 to 4. FIG. 2 is an enlarged plan view of a main part of the solid-state imaging device according to the embodiment of the invention. FIG. 3 is an explanatory view schematically showing vertical charge transfer electrodes and transferred signals, and showing distribution of electric potential generated by the vertical charge transfer electrodes. FIG. 4 is a schematic view showing the method for driving the solid-state imaging device.

As shown in FIG. 2, the solid-state imaging device 100 according to the embodiment of the invention has a light receiving section 95 in which a large number of photoelectric conversion elements 91 are arranged two-dimensionally along a row direction (a direction indicated by an arrow X) and a column direction (a direction indicated by an arrow Y). Each of the photoelectric conversion elements 91 includes a photodiode composed of semiconductor, and generates a signal charge according to an amount of light which is determined by intensity of light being incident on its light receiving surface and a length of an exposing time.

In order to take out the respective signal charges, which are output from the large number of the photoelectric conversion elements 91 two-dimensionally arranged, from an output terminal of the solid-state imaging device 100 as signals per every time-series frame, the solid-state imaging device 100 includes a plurality of vertical charge transfer sections 93, a horizontal charge transfer section 71, and an output amplifier 73.

Each vertical charge transfer section 93 is disposed at positions adjacent to the photoelectric conversion elements and extends in a vertical direction (the direction indicated by the arrow Y) in the figure. Each vertical charge transfer section 93 sequentially transfers the signal charges, which are received from the photoelectric conversion elements 91 of a corresponding column, in the direction of the arrow Y.

The horizontal charge transfer section 71 is disposed on an output side of the vertical charge transfer sections 93 of the respective columns. The signal charges corresponding to one row are transferred from the vertical charge transfer sections 93 to the horizontal charge transfer section 71. The horizontal charge transfer section 71 sequentially transfers the signal charges corresponding to the one row in a horizontal direction (the direction indicated by the arrow X). The signal charges, which appear at an output of the horizontal charge transfer section 71, are amplified by the output amplifier 73 and output from an output terminal OUT.

In addition, a line memory (not shown) may be provided between the vertical charge transfer sections 93 and the horizontal charge transfer section 71. Thereby, it is possible to temporarily accumulate in the line memory the signal charges, which correspond to the one row and are concurrently output from the respective vertical charge transfer sections 93, and to transfer the signal charges, which correspond to the one row and are accumulated, from the line memory to the horizontal charge transfer section 71.

Control signals necessary for realizing such a reading operation, specifically, vertical transfer controlling signals φV1 to φV12 (12-phase drive) and horizontal transfer controlling signals φH (not shown) are generated by a timing signal generating circuit (not shown) which is provided in the imaging device driving section 29 (See FIG. 1), and are applied to the vertical charge transfer sections 93 and the horizontal charge transfer section 71 of the solid-state imaging device 100.

The large number of the photoelectric conversion elements 91 are arranged so as to form a honeycomb-shaped pattern (a pattern in which the photoelectric conversion elements 91 on every row are shifted by ½ pitch in the horizontal direction). Color components to be detected by the respective photoelectric conversion elements 91 are determined in advance, as shown by "G", "B", and "R" in FIG. 2. Specifically, the photoelectric conversion elements 91 of "G" detect brightness of the green component, the photoelectric conversion elements 91 of "B" detect brightness of the blue component, and the photoelectric conversion elements 91 of "R" detect brightness of the red component. These colors to be detected are set by the spectral characteristics of optical filters which are disposed on the front side of the light receiving surfaces of the respective photoelectric conversion elements 91.

In the example shown in FIG. 2, each column of the Bayer arrangement is arranged plural times to be consecutive in the row direction (in this specification, the arrangement shown in FIG. 2 may be referred to as a "double Bayer arrangement"). In each column of the Bayer arrangement, a photoelectric conversion element for detecting one color component corresponding to each column and a photoelectric conversion element for detecting another color component corresponding to each column are arranged alternately in the column direction. Specifically, (i) first photoelectric conversion element columns 81 in which a column of GRGR . . . being arranged in order from an upper side of the figure and a column of BGBG . . . being arranged in order from the upper side of the figure are alternately arranged and (ii) second photoelectric conversion element columns 83, which are shifted by ½ of an array pitch in the horizontal direction and in the vertical direction with respect to the first photoelectric conversion element columns 81, are repeatedly arranged in the row direction.

The vertical charge transfer sections 93 are formed in a meandering shape for each column of the photoelectric conversion elements 91 and at a position adjacent to each column of the photoelectric conversion elements 91. Each of the vertical charge transfer sections 93 includes a vertical charge transfer channel 75 formed in a semiconductor substrate. Each vertical charge transfer section 93 also includes a large number of first vertical transfer electrodes 77 and a large number of second vertical transfer electrodes 79. The first and second vertical transfer electrodes 77, 79 are disposed above the semiconductor substrate trough an insulating film (not shown) and transfer the signal charges.

A predetermined distribution of electric potentials are formed in each charge transferring channel 75 by applying predetermined electric voltages to the respective electrodes 77, 79. The voltages applied to the respective electrodes are sequentially switched, to thereby transferring the signal charges of the respective pixels in the objective direction in the vertical charge transfer sections 93 (the vertical charge transfer channels 75).

One first vertical transfer electrode 77 and one second vertical transfer electrode 79 are formed for each row of the photoelectric conversion elements 91. It is noted that the first vertical transfer electrodes 77 also function as reading gates for controlling transfer of the signal charges from the photoelectric conversion elements 91 to the vertical charge transfer channels 75 of the vertical charge transfer sections 93.

Any of the vertical transfer control signals φV1 to φV12 in 12 phases (may be referred to as "driving pulses") are applied to the second vertical transfer electrodes 79 and the first vertical transfer electrodes 77, which are alternately arranged in the direction of the arrow Y, according to a positional relation between the second vertical transfer electrodes 79 and the first vertical transfer electrodes 77.

As shown in FIG. 3, in each vertical charge transfer channel 75 (each vertical charge transfer section 95), a plurality of charge accumulation packets P are formed. One charge accumulation packet P is arranged for three rows of the photoelectric conversion elements 91. The signal charges, which are read from the three rows of the photoelectric conversion elements 91, are collectively accumulated in the one charge accumulation packet P. The signal charges of the three rows, which are accumulated in each charge accumulation packet P, are transferred in the vertical direction in synchronism with the vertical transfer control signals φV1 to φV12 in 12 phases, as shown in a timing chart in FIG. 3.

Now, with reference to FIG. 4, a method for driving the solid-state imaging device will be described. In the following embodiments, square frames represent the photoelectric conversion elements 91, and the symbols 'R', 'G', 'B' surrounded by small circles represent the signal charges of the respective color components. A square frame, in which a small circle is drawn, means that a signal charge of a corresponding color exists in the photoelectric conversion element 91. A square frame, in which no small circle is drawn, means that no signal charge exists in the photoelectric conversion element 91. Moreover, rectangular frames drawn in the lower right corners of the square-shaped frames represent reading gates for reading the signal charges from the photoelectric conversion elements 91 into the vertical charge transfer channels 75 (the charge accumulation packets P).

In this embodiment, each of the vertical charge transfer channels 75 is divided so that each charge accumulation packet P corresponds to three photoelectric conversion elements 91, which are consecutive in the vertical direction of the figure. Moreover, FIGS. 4(a) to 4(e) show states where the signal charges are transferred with the lapse of time.

As shown in FIG. 4(a), in the solid-state imaging device 100, the respective photoelectric conversion elements 91 are exposed to light for a predetermined period, to accumulate signal charges of the respective colors therein. If a reading voltage is applied to the photoelectric conversion elements 91 on the odd-numbered rows (first and third rows) corresponding to the respective charge accumulation packets P, two signal charges of the same color component are read into the respective charge accumulation packets P (see FIG. 4(b-1)). Specifically, into the charge accumulation packets P of the first and second columns from the left in the figure, two R signal charges, two G signal charges, two R signal charges . . . in order from the top are read. Into the charge accumulation packets P of the third and fourth columns, two G signal charges, two B signal charges, two G signal charges . . . in order from the top are read. Then, the signal charges are added to each other in each charge accumulation packet P (FIG. 4(b-2)). In this embodiment, the two signal charges which have been added to each other are denoted by 2R, 2G or 2B.

In this specification, the "rows" are defined so as to correspond to the respective photoelectric conversion elements 91 in each column. Specifically, the first row, the second row . . . are defined from an upstream side in the charge transferring direction, and the same row for the adjacent columns is arranged in the diagonal direction.

Then, as shown in FIG. 4(c), each charge accumulation packet P into which the signal charges 2R, 2G or 2B have been read is shifted in the vertical charge transfer channel 75 in the vertical direction by one packet. In this manner, each charge accumulation packet P which has the signal charges 2R, 2G or 2B is brought to a position corresponding to the photoelectric conversion element 91 in which the unread signal charge remains which has the same color component R, G or B as the signal charges 2R, 2G or 2G accumulated in each charge accumulation packet P.

Herein, as shown in FIG. 4(d), the signal charge R, G or B is read into each charge accumulation packet P from the photoelectric conversion element 91 in which the signal charge R, G or B remains. Then, the signal charges R, G or B of the same color components as the signal charges 2R, 2G or 2B accumulated in each charge accumulation packet P will be read and added thereto in each charge accumulation packet P. As a result, the signal charges 3R, 3G or 3B obtained by adding the three signal charges R, G, B of the same color components are accumulated in each charge accumulation packet P. In other words, the signal charges R, G, B of all the photoelectric conversion elements 91 are summed by the respective color components and read into the charge accumulation packets P (FIG. 4(e)).

Then, the signal charges 3R, 3G, 3B which have been summed are transferred in the vertical charge transfer sections 93 in the vertical direction to the horizontal transfer section 71, further transferred in the horizontal charge transfer section 71 in the horizontal direction, amplified by the output amplifier 73, and output from the output terminal OUT. The signal processing operation based on the above described driving method is performed according to commands from the imaging device driving section 29 which may serve as a signal processing unit (See FIG. 1).

As described above, the signal charges R, G, B of the photoelectric conversion elements 91 are not discarded, but the signal charges R, G, B of all the photoelectric conversion elements 91 are summed by the respective color components and output. Therefore, enhanced sensitivity of the solid-state imaging device 100 can be realized. Moreover, according to the imaging apparatus 200 provided with the solid-state imaging device 100 as described above, when either of taking moving images and controlling the AE/AF is conducted, it is possible to acquire images with enhanced sensitivity, by switching the driving method to the above-described driving method for signal processing. As a result, even in such a photographic scene where light is not sufficient, the moving images of high sensitivity can be obtained. Moreover, it is possible to take images with the accurately controlled AE/AF.

Second Embodiment

Figure 5:
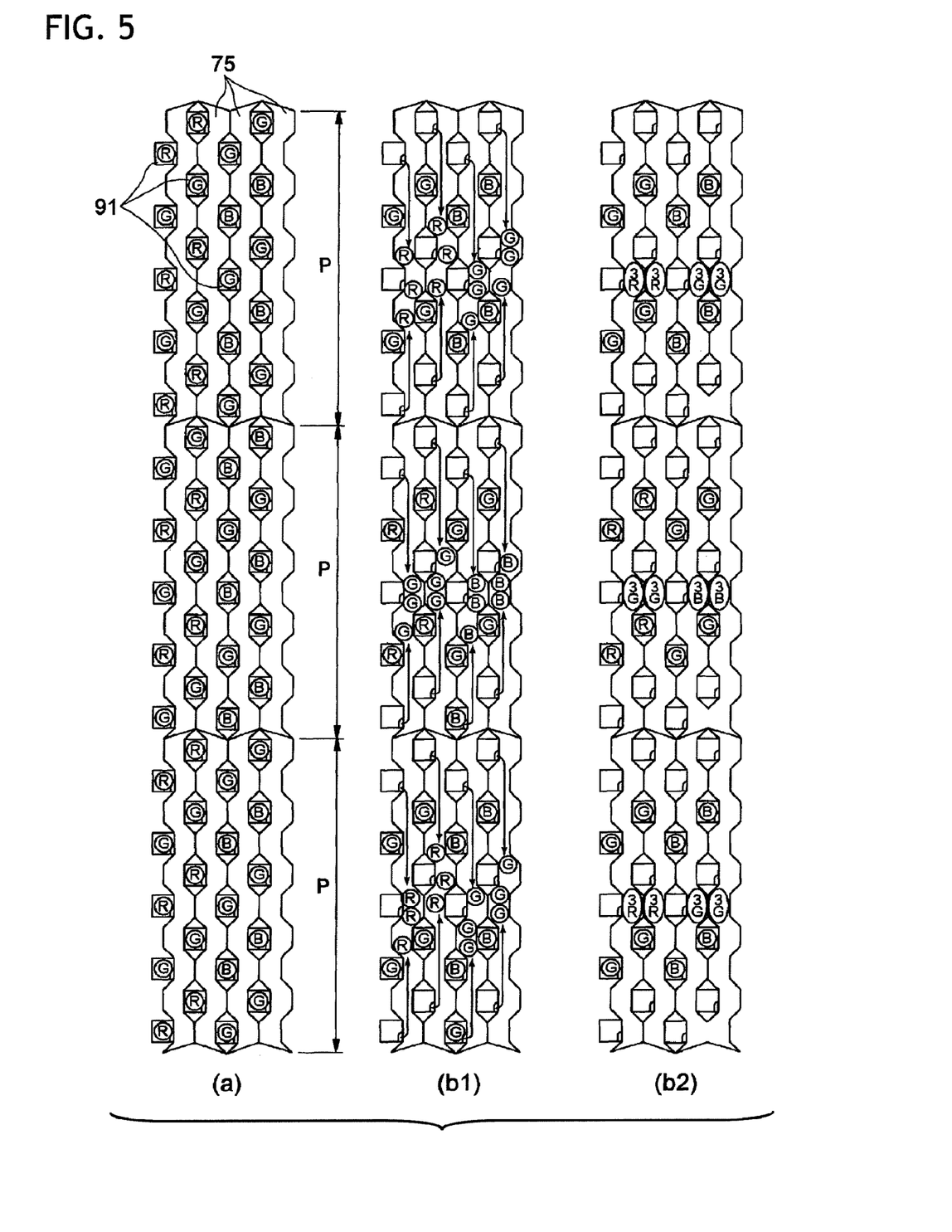
FIG. 5 is a schematic view showing the first half of a method for driving the solid-state imaging device, according to a second embodiment.
Figure 6:
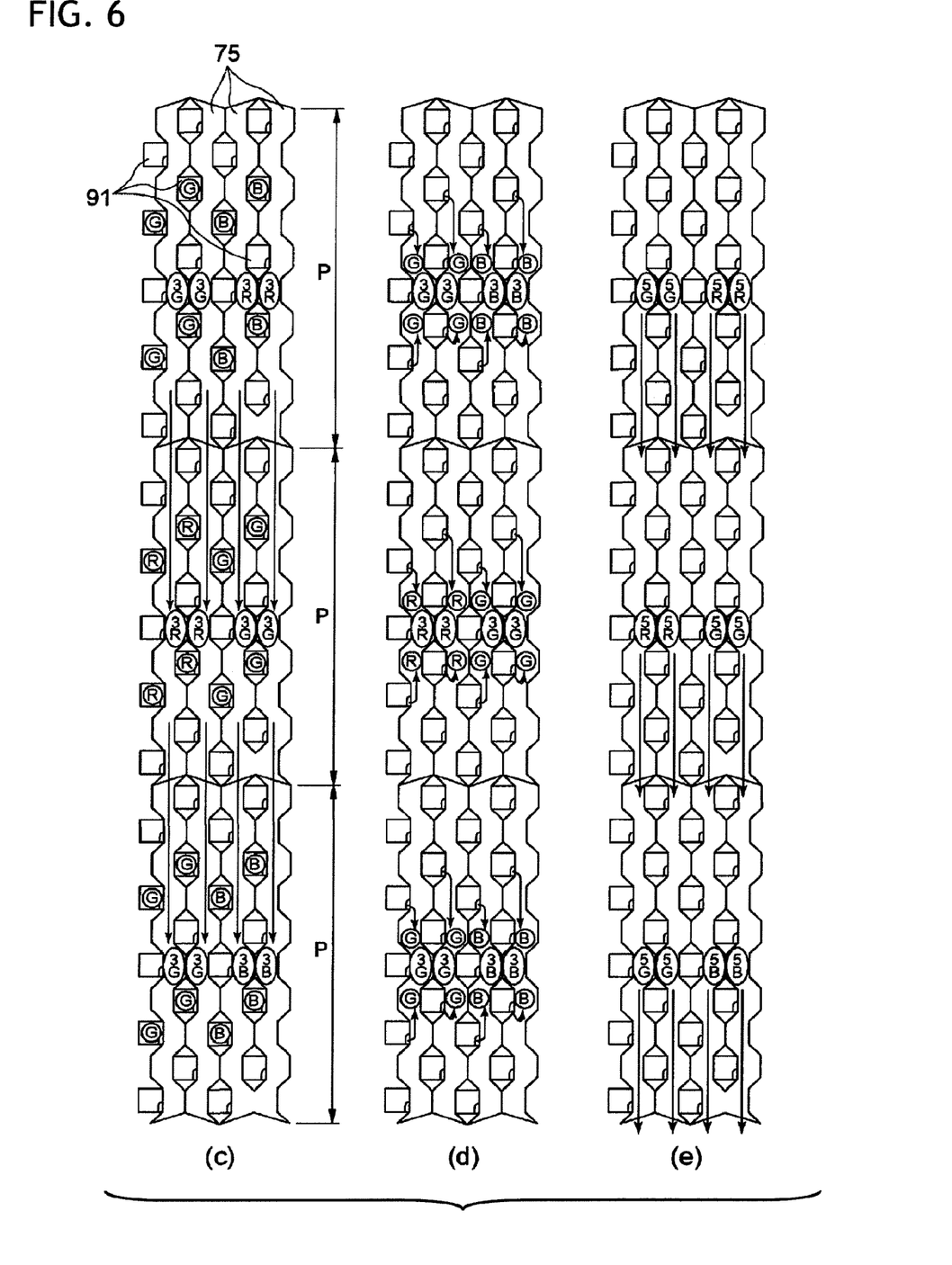
FIG. 6 is a schematic view showing the second half of the method for driving the solid-state imaging device, according to the second embodiment.

The above described method for driving the solid-state imaging device can be achieved by using the solid-state imaging device 100 in which a photoelectric conversion element for detecting one color component and a photoelectric conversion element for detecting another color component are arranged alternately in the vertical direction, and by reading signal charges R, G, B from three or more photoelectric conversion elements 91 of odd-numbered rows into the corresponding charge accumulation packet P. FIGS. 5 and 6 are schematic views showing a method for driving the solid-state imaging device according to a second embodiment. FIG. 5 shows the first half of the driving method, and FIG. 6 shows the second half of the driving method.

As shown in FIGS. 5 and 6, in the solid-state imaging device of the second embodiment, the vertical charge transfer channels 75 are divided so that each charge accumulation packet P corresponds to five photoelectric conversion elements 91 which are arranged in the vertical direction in the figures.

As shown in FIG. 5(*a*), when a reading voltage is applied to the photoelectric conversion elements 91 on the odd-numbered rows (the first, third and fifth rows) with respect to each charge accumulation packet P, the signal charges of the same color component are read into each charge accumulation packet P, and added to each other in each charge accumulation packet P (FIG. 5(*b*1)). Specifically, in each charge accumulation packet P, the signal charges which have been read from the three photoelectric conversion elements 91 are summed to generate signal charges 3R, 3G, 3B (FIG. 5(*b*2)). In this state, each charge accumulation packet P having the signal charges 3R, 3G or 3B is vertically transferred in the vertical charge transfer channels 75 by one packet. Thereby, each charge accumulation packet P is brought to a position corresponding to two photoelectric conversion elements 91 in which unread signal charges remain which has the same color component R, G or B as that of the three signal charges accumulated in each charge accumulation packet P.

Then, as shown in FIG. 6(*d*), the signal charges R, G or B are read into each charge accumulation packet P from the two photoelectric conversion elements 91 in which the unread signal charges R, G or B remain. Then, the two signal charges R, G, B of the same color components are further read into the respective charge accumulation packets P and added thereto in the respective charge accumulation packets P. As a result, the signal charges 5R, 5G, 5B obtained by adding the five signal charges R, G, B of the same color components are accumulated the respective charge accumulation packets P (FIG. 6(*e*)).

Thereafter, in the same manner as in the solid-state imaging device 100 of the first embodiment, the signal charges 5R, 5G, 5B obtained by adding the signal charges are sequentially transferred in the vertical charge transfer sections 93 in the vertical direction and in the horizontal charge transfer section 71 in the horizontal direction, amplified by the output amplifier 73, and output from the output terminal OUT.

In the above described method for driving the solid-state imaging device, the signal charges, which are on the odd-numbered rows and have the same color component, are read into each charge accumulation packet P, added to each other in each charge accumulation packet P, and vertically transferred by one packet. Thereafter, the remaining unread signal charges are read and added thereto. It is theoretically possible to perform this driving method irrespective of the number of the photoelectric conversion elements 91 from which the signal charges are read and added to each other. However, actually, a quality of a resultant image is deteriorated with increase of the number of the photoelectric conversion elements 91. Therefore, the number of the photoelectric conversion elements 91 from which the signal charges are read and added is preferably three or five, and more preferably, three.

In the configuration of this embodiment, the five signal charges are added to each other. Therefore, the amount of the signal charges can be increased, and more enhanced sensitivity can be obtained. The other operation and effects are substantially the same as the solid-state imaging device of the first embodiment.

Third Embodiment

Figure 7:
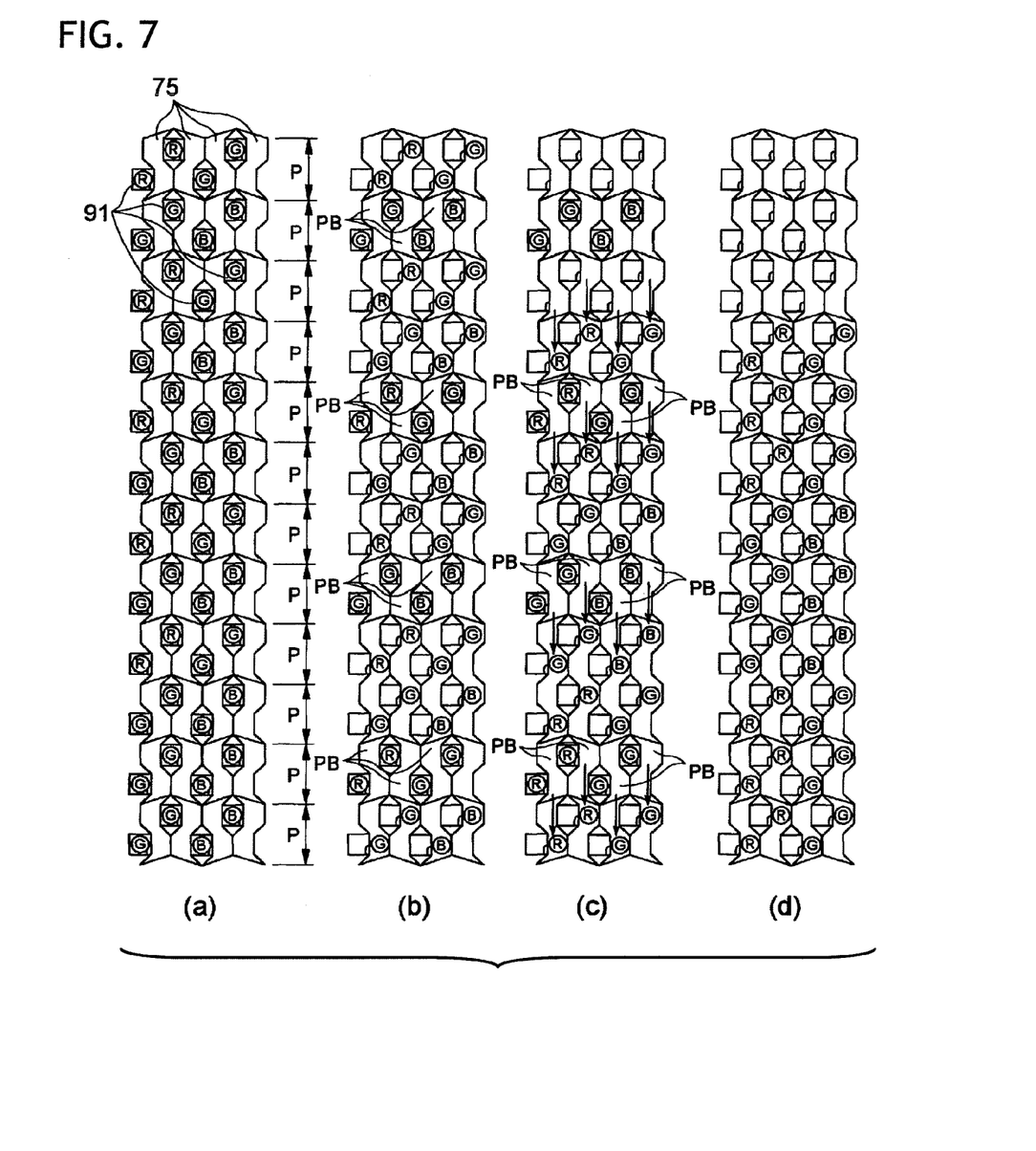
FIG. 7 is a schematic view showing a method for driving the solid-state imaging device according to a third embodiment and shows a state where signal charges of the same color component are read into the vertical charge transfer sections to be consecutive.
Figure 8:
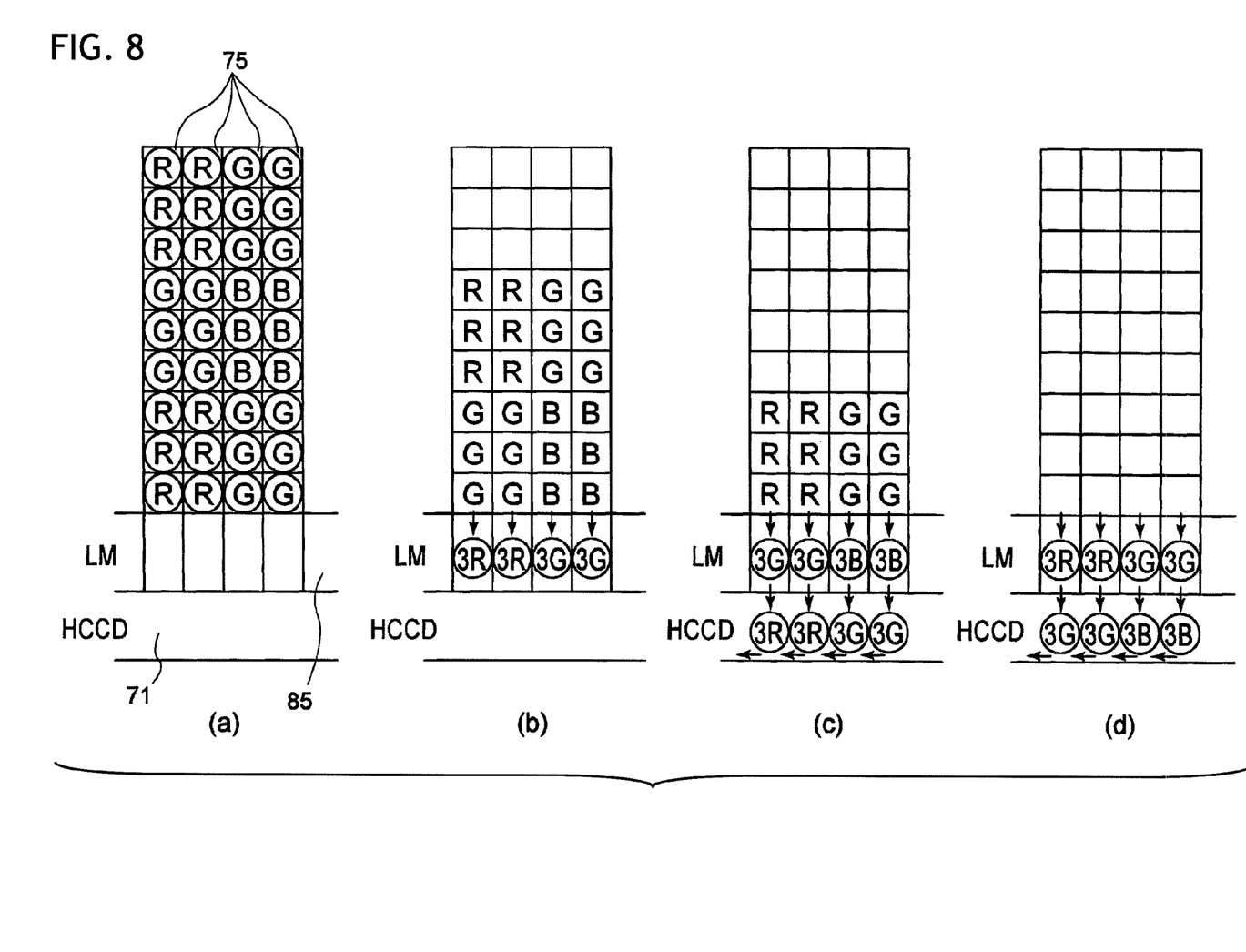
FIG. 8 is a schematic view showing a state where the consecutive signal charges of the same color component, which are read in FIG. 7, are added in the horizontal charge transfer section.

In the above described first and second embodiments, the case where the signal charges are added to each other in the vertical charge transfer sections 93 (the vertical charge transfer channels 75) has been described. However, it is also possible to add the signal charges to each other in the horizontal charge transfer section. FIGS. 7 and 8 are schematic views showing a method for driving a solid-state imaging device in which signal charges are added to each other in the horizontal charge transfer section. FIG. 7 is a schematic view showing a state where the signal charges are read into the vertical charge transfer sections so that the signal charges of the same color component be consecutive. FIG. 8 is a schematic view showing a state where the consecutive signal charges of the same color component are added to each other in the horizontal charge transfer section (a line memory).

As shown in FIGS. 7 and 8, in each column of the solid-state imaging device 100 of the third embodiment, a photoelectric conversion element for detecting one color component corresponding to each column and a photoelectric conversion element for detecting another color component corresponding to each column are arranged alternately in the column direction. Each vertical charge transfer channel 75 is divided so that one charge accumulation packet P corresponds to one photoelectric conversion element 91.

As shown in FIG. 7(*a*), the photoelectric conversion element 91 for detecting one color component and the photoelectric conversion element 91 for detecting another color component are arranged alternately in the column direction (RGRG . . . and GBGB . . . ). An operation of reading the signal charges corresponding to two rows and an operation of not reading the signal charge corresponding to one row are sequentially repeated along the column direction. Thereby, blank charge packets PB each corresponding to one row appear in every three rows, and are separately arranged in the vertical charge transfer channels 75 (FIG. 7(*b*)).

Then, as shown in FIG. 7(*c*), the signal charges in the vertical charge transfer channels 75 are transferred by the three rows, and the blank charge packets PB in the vertical charge transfer channels 75 are brought to positions corresponding to the photoelectric conversion elements 91 in which the unread signal charges remain. The remaining unread signal charge of each photoelectric conversion element 91 has the same color component as that of the signal charge having been read into the charge accumulation packets P in front of and in rear of the corresponding blank charge packet PB. In this state, when the signal charge which remains in each photoelectric conversion elements 91 is read into the corresponding blank charge packet PB, the three consecutive signal charges R, Q B of the same color component are accumulated in the vertical charge transfer channels 75. Specifically, the three signal charges of the same color component appear consecutively in order of RRRGGGRRR in the first and second columns of the vertical charge transfer channels 75, and in order of GGGBBBGGG in the third and fourth columns of the vertical charge transfer channels 75, as shown in FIG. 8(*a*).

The signal charges in the vertical charge transfer channels 75 are transferred in the vertical direction by three rows. Then, the signal charges of the same color component are added to each other (3R, 3G, 3B) in the line memory 85 (FIG. 8(b)), and thereafter, transferred to the horizontal charge transfer section 71 (FIG. 8(c)). The horizontal charge transfer section 71 sequentially transfers the summed signal charges 3R, 3G, 3B in the horizontal direction, and outputs (FIG. 8(d)).

Figure 9:
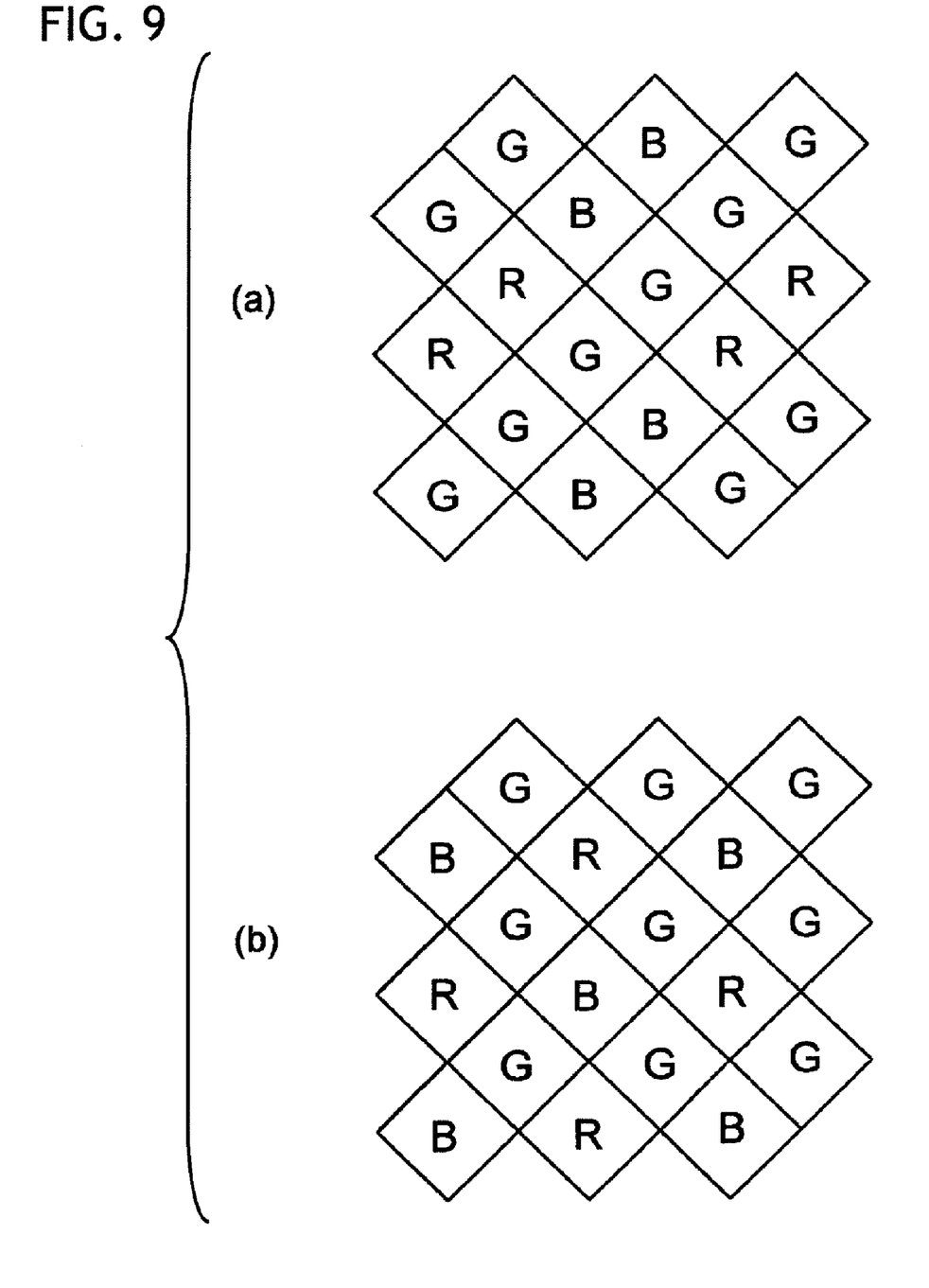
FIG. 9 is a plan view showing examples of an arrangement of photoelectric conversion elements in a solid-state imaging device.

In the forgoing description, the double Bayer arrangement in which the color components of the photoelectric conversion elements are arranged as shown in FIG. 9(a) has been described. However, this driving method may be applied to a solid-state imaging device which has such arrangement as inclined by 45 degree from the Bayer arrangement, as shown in FIG. 9(b). In this arrangement, substantially the same effects can be obtained.

Descriptions of the other functions and effects of the above described embodiment will be omitted, because they are substantially the same as in the solid-state imaging device of the first embodiment. Moreover, although the signal charges are added in the line memory 85 in the above described embodiment, it is also possible to conduct the adding process in the horizontal charge transfer section 71.

Comparative Examples

Figure 10:
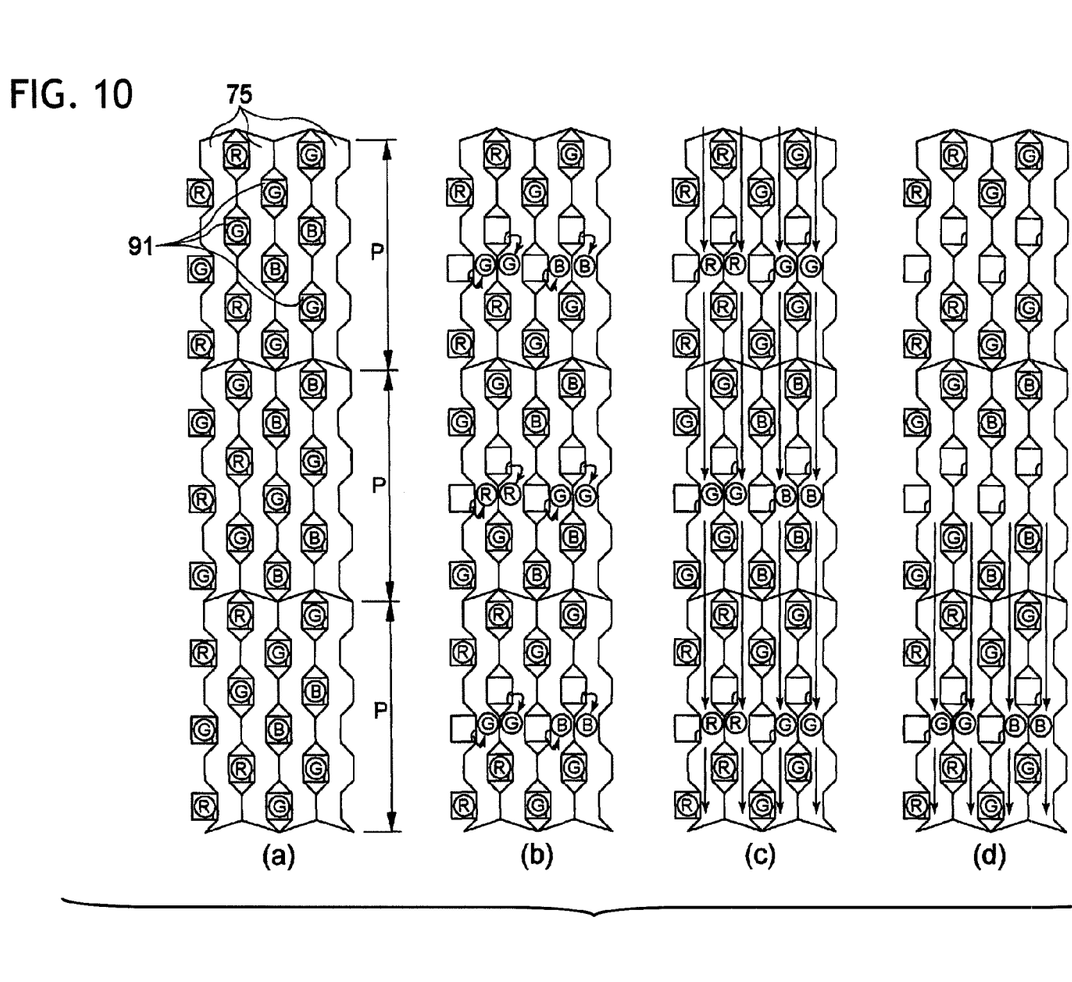
FIG. 10 is a schematic view showing a solid-state imaging device of a comparative example.
Figure 11:
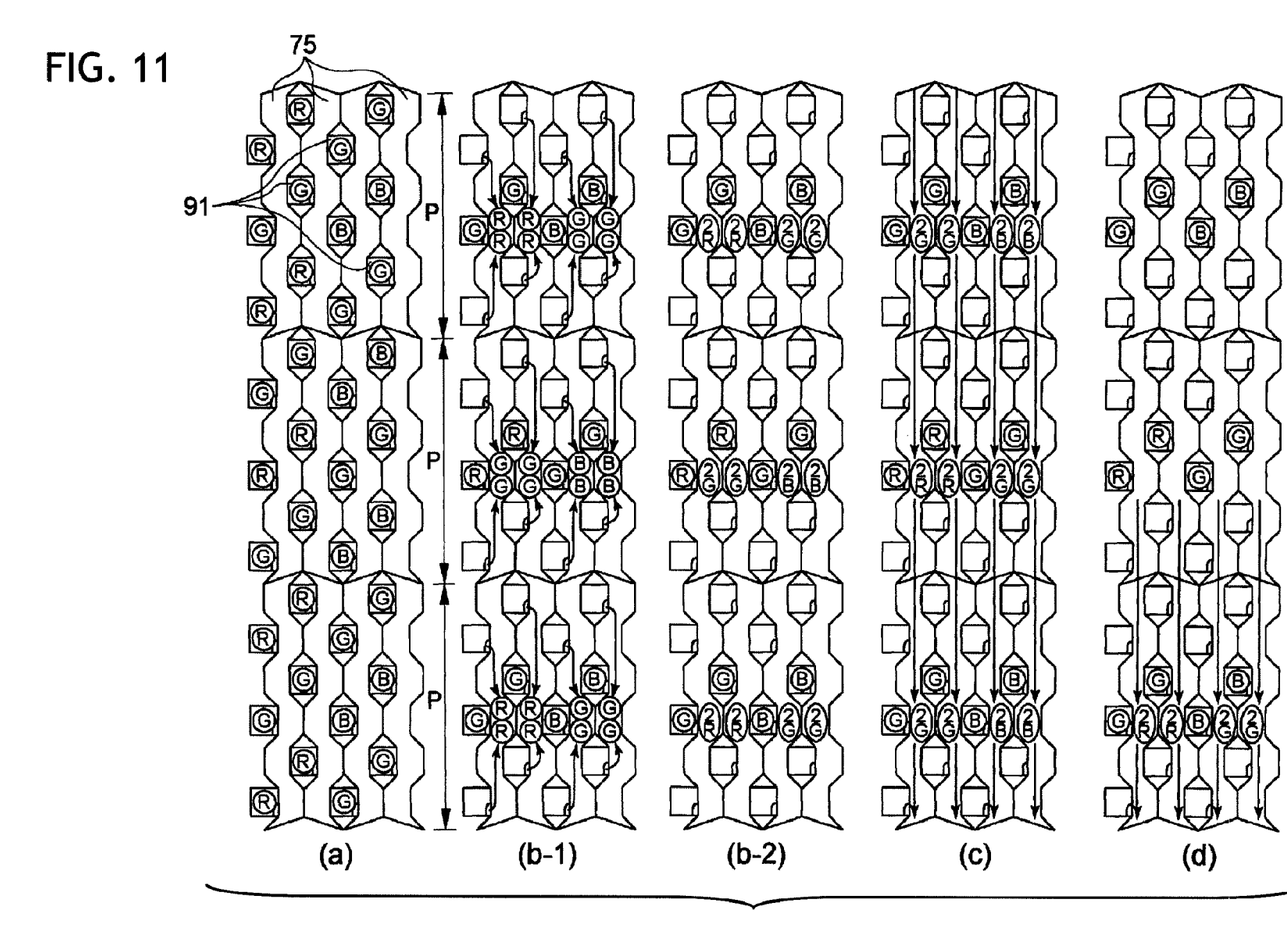
FIG. 11 is a schematic view showing a solid-state imaging device of another comparative example.

Now, referring to FIGS. 10 and 11, a driving method of comparative examples will be briefly described, for the purpose of comparing them with the driving methods according to the first to third embodiments described above. FIG. 10 is a schematic view showing a method for driving a solid-state imaging device according to a first comparative example. FIG. 11 is a schematic view showing a method for driving a solid-state imaging device according to a second comparative example.

As shown in FIG. 10(a), in the solid-stage imaging device of the first comparative example, each vertical charge transfer channel 75 is divided so that one charge accumulation packet P corresponds to three photoelectric conversion elements 91 which are arranged in the vertical direction in the figure.

In the method for driving the solid-state imaging device according to the first comparative example, the signal charges of the photoelectric conversion elements 91 are read by performing an operation of reading signal charges of one row and an operation of not reading signal charge of two rows repeatedly along the column direction. As a result, the signal charges are read in order of G, R, G . . . into the respective charge accumulation packets P of the first and second columns from the left in the figure, and in order of B, Q B . . . into the respective charge accumulation packets P of the third and fourth columns. Then, the signal charges are transferred by one packet in the vertical direction (see FIGS. 10(c) and 10(d)) to the horizontal charge transfer section 71, and further transferred in the horizontal direction for output.

According to the method for driving the solid-state imaging device according to the first comparative example, only one third of the signal charges which are stored in the photoelectric conversion elements 91 are used, while the remaining two thirds of the signal charges are discarded. Therefore, the signal processing at high speed can be realized, although the image has low sensitivity.

As shown in FIG. 11(a), in the solid-state imaging device of the second comparative example, each vertical charge transfer channel 75 is divided so that each charge accumulation packet P corresponds to three photoelectric conversion elements 91 which are arranged in the vertical direction in the figure.

In the method for driving the solid-state imaging device according to the second comparative example, the signal charges of the photoelectric conversion elements 91 are read by an operation of reading signal charges of two rows and an operation of not reading a signal charge of one row repeatedly along the column direction as shown in FIG. 11(b-1). As a result, the two signal charges of the same color component are read and added to each other in each charge accumulation packet P. Specifically, the signal charges are read in order of 2R, 2G, 2R . . . into the respective charge accumulation packets P of the first and second columns from the left in the figure, and in order of 2G, 2B, 2G . . . in the respective charge accumulation packets P of the third and fourth columns (see FIG. 11(b-2)).

The signal charges 2R, 2Q 2B which have been read are transferred by one packet in the vertical direction (see FIGS. 11(c) and 11(d)) to the horizontal charge transfer section 71, and further transferred in the horizontal direction through the horizontal charge transfer section 71 for output.

With the method for driving the solid-state imaging device according to the second comparative example, two thirds of the signal charges which are stored in the photoelectric conversion elements 91 are used, while the remaining one third of the signal charges are discarded. Therefore, the sensitivity is enhanced as compared with the driving method of the first comparative example.

It is noted that the method for driving the solid-state imaging device and the imaging apparatus according to the invention is not limited to the above described embodiments, but appropriate modifications and improvements may be made.

According to the invention, in taking moving images and in driving signals for controlling AE/AF, the signal charges of all the pixels are used. In this manner, it is possible to provide the solid-state imaging device and the imaging apparatus in which the moving images and the AE/AF images having enhanced sensitivity can be obtained.

What is claimed is:

1. A method for driving a solid-state imaging device wherein the solid-state imaging device includes
a light receiving section in which a plurality of photoelectric conversion elements are arranged in a row and column directions on a semiconductor substrate,
a plurality of vertical charge transfer sections that extend along the column direction of the photoelectric conversion elements, are arranged adjacent to the photoelectric conversion elements, read signal charges which are generated in the photoelectric conversion elements, and transfer the signal charges in a vertical direction,
a horizontal charge transfer section that transfers in a horizontal direction the signal charges, which are transferred from the vertical charge transfer sections, and
line memory that is disposed between the vertical charge transfer sections and the horizontal charge transfer section, and
in each column, of the photoelectric conversion elements, the photoelectric conversion element, which detects one color component corresponding to each column, and the photoelectric conversion element, which detects another color element corresponding to each column, are alternately arranged along the column direction,
the method comprising:

sequentially repeating, along the column direction, (i) reading, into the vertical charge transfer sections, the signal charges of the photoelectric conversion elements corresponding to two rows and (ii) not reading, into the vertical charge transfer sections, the signal charges of the photoelectric conversion elements corresponding to one row, to separately arrange blank charge packets in the vertical charge transfer sections, wherein each of the blank charge packets corresponds to one row;

transferring the signal charges in the vertical charge transfer sections by a distance corresponding to three rows;

reading, into each blank charge packet, the signal charge, which remains in the photoelectric conversion element and has the same color component as the signal charges accumulated in charge packets in front and rear of each blank charge packet, to obtain a set of three consecutive signal charges having the same color component;

adding the obtained three consecutive signal charges of each set to each other in the line memory or in the horizontal charge transfer section; and transferring the added signal charges.

* * * * *